US010565224B2

(12) United States Patent
Igarashi et al.

(10) Patent No.: US 10,565,224 B2
(45) Date of Patent: Feb. 18, 2020

(54) DATA PROVISION APPARATUS AND DATA PROVISION METHOD (71) Applicant: HITACHI, LTD., Tokyo (JP)

(72) Inventors: Yuichi Igarashi, Tokyo (JP); Shinichi Tsunoo, Tokyo (JP); Takahiro Ohira, Tokyo (JP)

(73) Assignee: HITACHI, LTD., Tokyo (JP)

( * ) Notice: Subject to any disclaimer, the term of this patent is extended or adjusted under 35 U.S.C. 154(b) by 309 days.

(21) Appl. No.: 15/789,328

(22) Filed: Oct. 20, 2017

(65) Prior Publication Data

US 2018/0113924 A1 Apr. 26, 2018

(30) Foreign Application Priority Data

Oct. 25, 2016 (JP) .................. 2016-209061

(51) Int. Cl.
*G06F 16/00* (2019.01)
*G06F 16/25* (2019.01)
*G06F 16/951* (2019.01)
*G06Q 10/06* (2012.01)
*G06Q 10/10* (2012.01)

(52) U.S. Cl.
CPC .......... *G06F 16/258* (2019.01); *G06F 16/254* (2019.01); *G06F 16/951* (2019.01); *G06Q 10/063* (2013.01); *G06Q 10/10* (2013.01)

(58) Field of Classification Search
CPC .... G06F 16/258; G06F 16/951; G06F 16/254; G06Q 10/063; G06Q 10/10
USPC ....................................................... 707/756
See application file for complete search history.

(56) References Cited

U.S. PATENT DOCUMENTS 7,143,112 B2 * 11/2006 Yagawa ................. G06F 16/254
7,512,540 B2 * 3/2009 Gluck .................... G06Q 30/02
705/1.1

(Continued)

FOREIGN PATENT DOCUMENTS

JP 2011-215984 A 10/2011
JP 2013-149173 A 8/2013

(Continued)

OTHER PUBLICATIONS

Extended European Search Report dated Jan. 31, 2018 for the European Application No. 17197566.7.

*Primary Examiner* — Hanh B Thai
(74) *Attorney, Agent, or Firm* — Volpe and Koenig, P.C.

(57) ABSTRACT

A data provision apparatus for providing site data to a service apparatus stores explanatory information for the site data including a specification of the site data, explanatory information of the service including the site data and a specification of the site data required by the service, and a rule for transforming the site data into that required by the service using the site data, the explanatory information of the site data, the explanatory information of the service, and the transformation rule being registered in advance; and refers to the explanatory information of the site data, the explanatory information of the service, and the transformation rule in response to a transfer request of the data from the service apparatus. All pieces of the site data used by the service are transformed into data of the specification required by the service and are transferred to the service apparatus.

6 Claims, 7 Drawing Sheets (56) References Cited

U.S. PATENT DOCUMENTS

| | | | | |
|---|---|---|---|---|
| 8,521,754 B2* | 8/2013 | Trevor | ................ | G06F 16/958 |
| | | | | 707/756 |
| 8,599,408 B2* | 12/2013 | Grueneberg | .......... | G06F 3/1204 |
| | | | | 358/1.15 |
| 2015/0310072 A1 | 10/2015 | Dietz et al. | | |

FOREIGN PATENT DOCUMENTS

| | | |
|---|---|---|
| JP | 2015-210818 A | 11/2015 |
| WO | 01/95041 A1 | 12/2001 |
| WO | 2004/086160 A1 | 10/2004 |

* cited by examiner

Site Data Explanatory Information Management Table

| Data Name | Site-Data-Based Specifications Information | | | | 40 |
|---|---|---|---|---|---|
| | Generation Granularity | Collection Frequency | Time Accuracy | ... | |
| Site System 1 Sensor 1 | Milliseconds | Once per day | Less than ±0ms | ... | |
| Site System 1 Sensor 2 | Milliseconds | Once per day | Less than ±0ms | ... | |
| Site System 2 Sensor 1 | Hours | Once per hour | Less than ±5 min | ... | |
| Site System 3 Sensor 1 | Days | Once per day | Less than ±5 min | ... | |
| ... | ... | ... | ... | ... | |

First Service Explanatory Information Management Table

| Service Name | Required Data Specifications Information | | ... |
|---|---|---|---|
| | Required Granularity | Required Frequency | |
| Service 1 Application 1 | Days | Once per day | ... |
| ... | ... | ... | ... |

Second Service Explanatory Information Management Table

| Service Name | Required Site Data | | | |
|---|---|---|---|---|
| Service 1 Application 1 | Site System 1 Sensor 1 | Site System 1 Sensor 2 | Site System 2 Sensor 1 | ... |
| Service 2 Application 2 | Site System 2 Sensor 1 | — | — | ... |
| ... | ... | ... | ... | ... |

Service-Based Transformation Rule Management Table

| Site Data Name | Search Acquisition Rule | Post-acquisition Transformation Rule | |
| --- | --- | --- | --- |
| | | Data Trans-formation Rule | Deficiency Rule |
| Site System 1 Sensor 1 | Rule Number 1 | No transformation | Linear Interpolation |
| Site System 1 Sensor 2 | Rule Number 1 | No transformation | Linear Interpolation |
| Site System 2 Sensor 1 | Rule Number 2 | Average Value | Linear Interpolation |
| Site System 3 Sensor 1 | No transformation | No transformation | Linear Interpolation |
| ... | ... | ... | ... |

43AA  43AB  43ACA  43ACB
43AC
43A

FIG.7

Search Acquisition Rule Management Table

| Rule Number | Rule Content |
| --- | --- |
| 1 | YY/MM/DD ⇒ Between YY/MM/DD.00:00:00.00 and YY/MM/DD.23:59:59.99 |
| 2 | YY/MM/DD ⇒ Between YY/MM/(DD-1).23 o'clock and YY/MM/DD.23 o'clock |
| ... | ... |

DATA PROVISION APPARATUS AND DATA PROVISION METHOD

TECHNICAL FIELD

The present invention relates to a data provision apparatus and a data provision method and is suited for use in, for example, a service provision system for acquiring site data from a site such as a production line of a factory and providing services by using the acquired site data.

BACKGROUND ART

In recent years, data management systems capable of collectively managing data collected from, for example, factory equipment and equipment at sites (hereinafter referred to as the "site data") have been provided for the purpose of providing services which utilize big data.

It should be noted that in the following description, visualization of a power amount measured within a factory and acquisition of an operation rate from a production quantity of products of each line will be called the "service(s)." Such service(s) will be provided by a service apparatus which is composed of, for example, a web server to users.

The respective site data have different types and structures and the service apparatus manages each piece of the site data by associating their explanatory information, that is, their meanings and how to read them, with each other so that the service apparatus can provide the users with the service which utilizes the site data.

For example, PTL 1 discloses a technique that generates a recommendation in response to a query on the basis of the context of a user, the context of the user's activity, and the content of the query and then returns the recommendation to a computing device. In this PTL 1, the context is used as the explanatory information.

Furthermore, PTL 2 discloses a data management system equipped with a query transformation apparatus for acquiring the site data from different table layouts and managing them in a common database when the data are integrated and used from a plurality of site systems.

CITATION LIST

Patent Literature

PTL 1: Japanese Patent Application Laid-Open (Kokai) Publication No. 2015-210818
PTL 2: Japanese Patent Application Laid-Open (Kokai) Publication No. 2013-149173

SUMMARY OF THE INVENTION

Problems to be Solved by the Invention

Meanwhile, when site data are to be used and there is a high relation between a site system for collecting the site data at a site and a service, the site data can be used efficiently by using the technique disclosed in PTL 1. In recent years, not only one organization uses the site data, but also there has been a widely growing tendency to make use of the site data for, for example, data analysis with respect to services having a low relation with the site system. When there are different table layouts for the site data at a plurality of site systems, the integration of the plurality of pieces of the site data can be realized efficiently by using the technique disclosed in PTL 2.

However, when the plurality of pieces of the site data are used in an integrated manner by using the techniques disclosed in PTL 1 and PTL 2, it is necessary to acquire the site data from the plurality of site systems by being aware of differences in granularity of each piece of site data represented by time information, data collection frequency, and data volumes.

Specifically speaking, when the specification of the site data (such as data granularity) is different from the specification of the site data required by the relevant service (such as data granularity), application software for providing that service (hereinafter referred to as the service application) transforms the site data into data which corresponds to the specification required by the service. However, every time a change of the specification occurs, for example, upon replacement of equipment at the relevant site, the specification of the site data changes. So, it becomes necessary to change the service application accordingly.

Since changes of equipment at a plurality of sites give influences on a plurality of services in the data integrated environment in these years, it is necessary for an administrator of the service apparatus to be always aware of changes of the equipment at each site. As a result, this causes a problem of an increase in management cost of the service(s) including cost for modifying the service application.

The present invention was devised in consideration of the above-described circumstances and aims at proposing a data provision apparatus and data provision method capable of holding down the management cost of the service(s).

Means to Solve the Problems

In order to solve the above-described problems, provided according to the present invention is a data provision apparatus for providing site data to a service apparatus for providing a service by using one or more pieces of site data respectively collected at one or more sites, wherein the data provision apparatus includes: a storage unit that stores explanatory information of each piece of the site data including a specification of the site data, explanatory information of the service including the site data and a specification of the site data which are required by the service, and a transformation rule for transforming the specification of the site data into the specification required by the service which uses the site data, the explanatory information of the site data, the explanatory information of the service, and the transformation rule being registered in advance; and a site data transformation execution unit that refers to the explanatory information of the site data, the explanatory information of the service, and the transformation rule in response to a transfer request of the site data from the service apparatus, transforms all pieces of the site data used by the service provided by the service apparatus into data of the specification required by the service, respectively, and transfers the transformed data to the service apparatus.

Furthermore, a data provision method executed by a data provision apparatus for providing site data to a service apparatus for providing a service by using one or more pieces of site data respectively collected at one or more sites is provided according to the present invention, wherein the data provision method includes: a first step executed by the data provision apparatus storing explanatory information of each piece of the site data including a specification of the site data, explanatory information of the service including the site data and a specification of the site data which are required by the service, and a transformation rule for transforming the specification of the site data into the specification required by the service which uses the site data, the explanatory information of the site data, the explanatory information of the service, and the transformation rule being registered in advance; and a second step executed by the data provision apparatus referring to the explanatory information of the site data, the explanatory information of the service, and the transformation rule in response to a transfer request of the site data from the service apparatus, transforming all pieces of the site data used by the service provided by the service apparatus into data of the specification required by the service, respectively, and transferring the transformed data to the service apparatus.

According to this data provision apparatus and data provision method, even if there is a difference between the specification of the site data required by the service and the actual specification of the site data, the difference can be absorbed and the site data with the specification required by the service can be provided to the service apparatus. Therefore, the administrator of the service apparatus does not have to be aware of, for example, equipment changes of each site system; and even when the specification of the site data is changed due to an equipment change at a site system, it is unnecessary to, for example, change the application for providing the service to the service apparatus.

Advantageous Effects of the Invention

A data provision apparatus and data provision method capable of holding down the management cost for the service(s) can be implemented according to the present invention.

DESCRIPTION OF EMBODIMENTS

An embodiment of the present invention will be explained below in detail with reference to the drawings.

(1) Service Provision System According to this Embodiment

Figure 1:
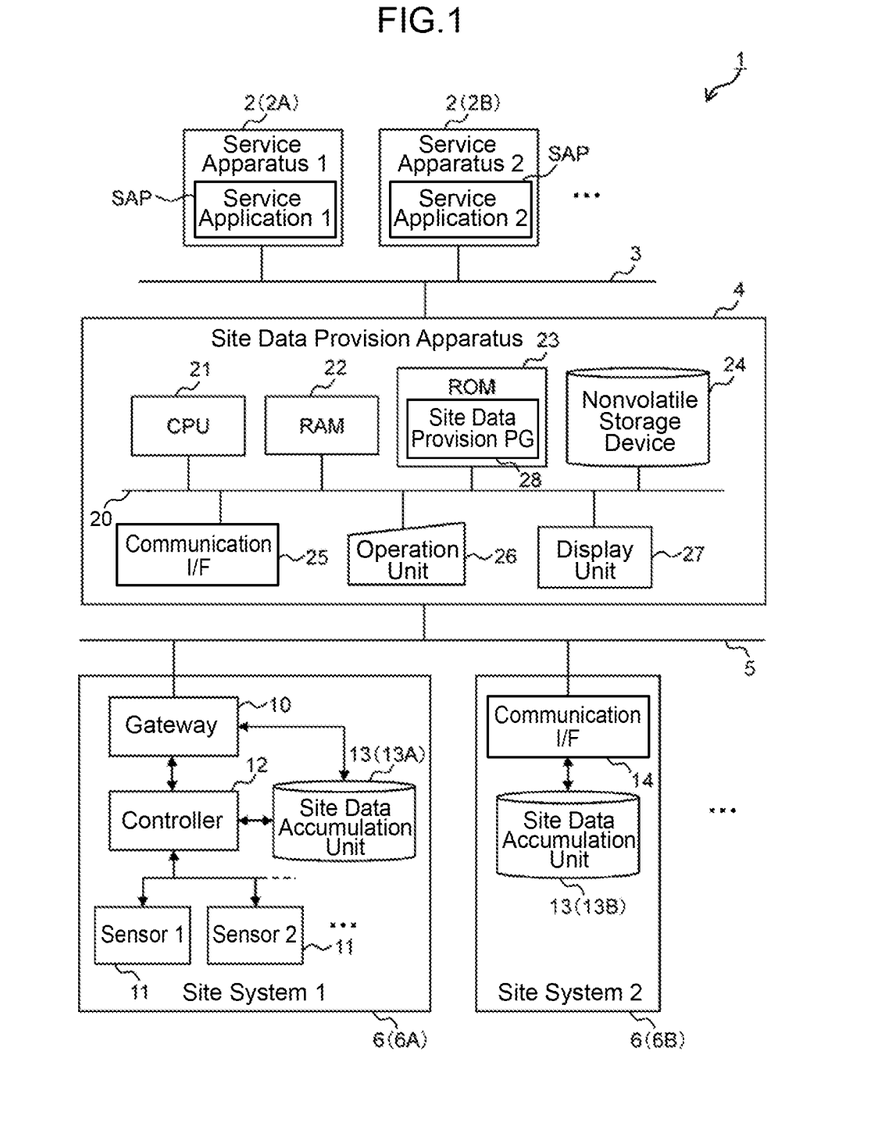
FIG. 1 is a block diagram illustrating an overall configuration of a service provision system according to this embodiment.

Referring to FIG. 1, the reference numeral 1 generally represents a service provision system according to this embodiment. This service provision system 1 is configured so that a plurality of service apparatuses 2 (2A, 2B, and so on) are connected to a site data provision apparatus 4 via a communication path 3 such as a network and the site data provision apparatus 4 is connected to a plurality of site systems 6 (6A, 6B, and so on) via a communication path 5 such as a network.

A service apparatus 2 is a server system in which an application program for providing a user with a service which utilizes site data collected respectively from each site system 6 as described later (hereinafter referred to as the service application) AP and is prepared for each service. The service apparatus 2 acquires necessary site data from the site system 6 via the site data provision apparatus 4.

The site system 6 is a system for acquiring the site data from the relevant site and accumulating the acquired site data and is provided for each site. Various settings of the site system 6 are managed by the service apparatus 2.

This site system 6 has various configurations depending on the type of the acquired site data. For example, a first site system 6A according to this embodiment is configured by including: a gateway for performing, for example, protocol transformation when communicating with the site data provision apparatus 4 via the communication path 5; a plurality of sensors 11 for performing specified sensing respectively; a controller 12 for controlling these sensors 11; and a site data accumulation unit 13 (13A) composed of a nonvolatile storage device for accumulating the site data composed of sensing information which is output from each sensor 11.

Furthermore, a second site system 6B is configured by including: a communication interface 14 for performing protocol control when communicating with the site data provision apparatus 4 via the communication path 5; and a site data accumulation unit 13 (13B) composed of a nonvolatile storage device which stores databases such as an MES (Manufacturing Execution System) and DCS for accumulating the site data collected to control, for example, a production plan.

The site data provision apparatus 4 is a server system that acquires, from the relevant site system 6, necessary site data for the service apparatus 2 to provide the user with the relevant service in response to a site data acquisition request made by the service apparatus 2 via the communication path 3 and provides the service apparatus 2 with the acquired site data with the specification corresponding to the content of the service.

This site data provision apparatus 4 is configured by including a CPU (Central Processing Unit) 21, a RAM (Random Access Memory) 22, a ROM (Read Only Memory) 23, a nonvolatile storage device 24, a communication interface 25, an operation unit 26, and a display unit 27 which are connected to each other via an internal bus 20.

The CPU 21 is a processor that supervises and controls the operation of the entire site data provision apparatus 4. Furthermore, the RAM 22 is used as a work memory for the CPU 21 and the ROM 23 is used mainly to store programs. A site data provision program 28 described later is also stored in this ROM 23; and site data provision processing described later by the site data provision apparatus 4 is executed by the CPU 21 reading this site data provision program 28 from the ROM 23 and executing it.

The nonvolatile storage device 24 is composed of, for example, nonvolatile storage media such as hard disk drives, SSDs (Solid State Drives), CD (Compact Disc)-ROM, CD-R, magnetic tapes, or nonvolatile memories and are used to retain applications and data for a long period of time. The nonvolatile storage device 24 stores an OS (Operating System) and various parameters as well as various programs for causing the site data provision apparatus 4 to function. A site data explanatory information management table 40, a first service explanatory information management table 41, a second service explanatory information management table 42, and a transformation rule management table group 43 which will be described later with reference to FIG. 2 are also stored and retained in this nonvolatile storage device 24.

The communication interface 25: is hardware for performing protocol control when communicating with the service apparatus 2 via the communication path 3 or when communicating with the site system 6 via the communication path 5; and is composed of, for example, an NIC (Network Interface Card). Furthermore, the operation unit 26 is composed of, for example, a keyboard and a mouse and is used for the user to input various operations and commands. The display unit 27 is composed of, for example, a liquid display monitor and displays necessary screens and processing results of various processing.

(2) Functional Configuration of Site Data Provision Apparatus

Figure 2:
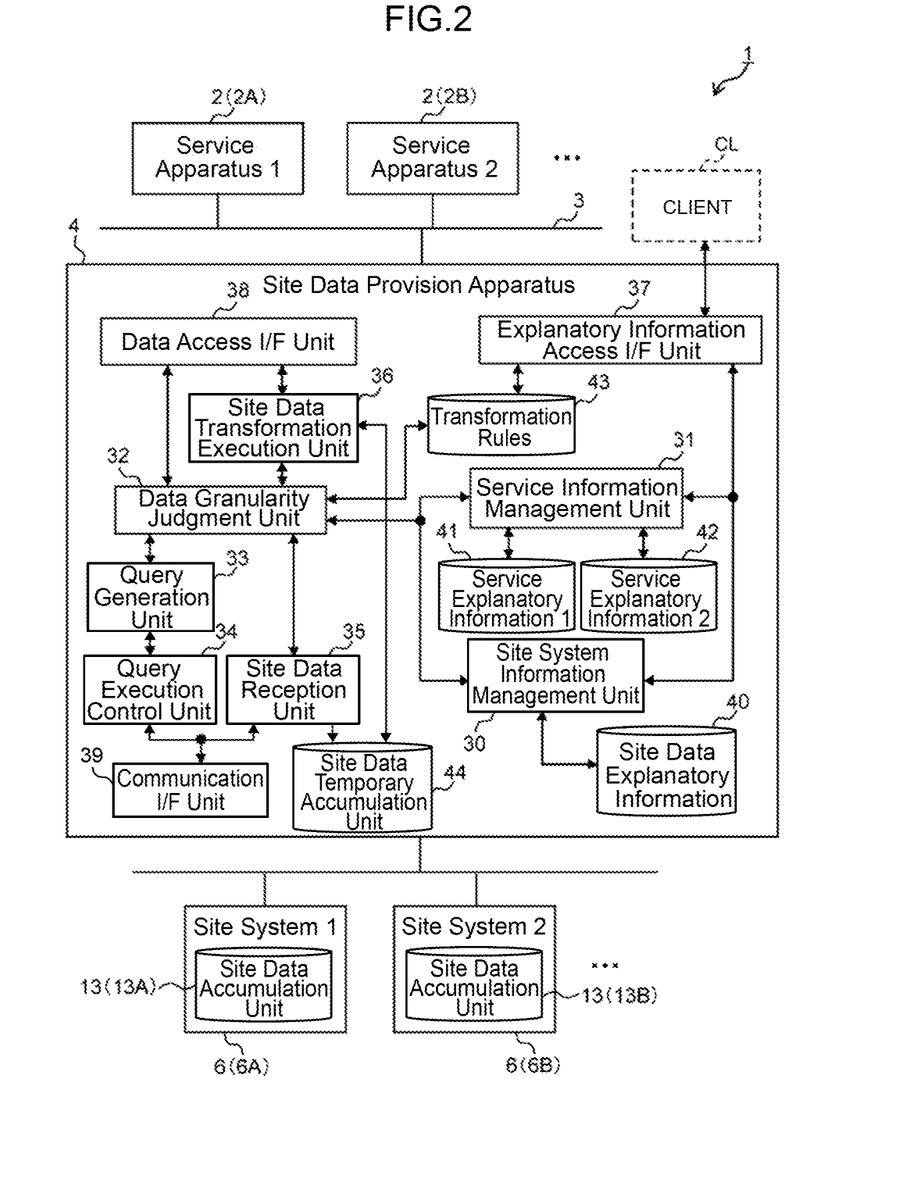
FIG. 2 is a block diagram illustrating a logical configuration of a site data provision apparatus.

FIG. 2 illustrates a functional configuration of the site data provision apparatus 4. In a case of this service provision system 1, the system administrator registers, in the site data provision apparatus 4 in advance, the specification such as a time interval during which the site data is generated (hereinafter referred to as the generation granularity), frequency at which the generated site data is collected and accumulated in the site data accumulation unit 13 (hereinafter referred to as the collection frequency), and accuracy of the time interval for generation of the site data (the generation granularity) (hereinafter referred to as the time accuracy) as explanatory information of the relevant site data (hereinafter referred to as the site data explanatory information) with respect to each piece of the site data collected by each site system 6.

Furthermore, the system administrator: registers, in the site data provision apparatus 4 in advance, the specification of the site data required by the relevant service such as frequency at which the site data is required by the service apparatus 2 for providing the service (hereinafter referred to as the required frequency) and a temporal range of the site data then required (hereinafter referred to as the required granularity) as first service explanatory information with respect to each service provided by the service apparatus 2; and registers, in the site data provision apparatus 4 in advance, the type(s) of necessary site data to provide that service, as second service explanatory information, with respect to each service.

Furthermore, regarding each service provided by the service apparatus 2 to the user, the system administrator registers, in the site data provision apparatus 4 in advance, the transformation rule for transforming the specification of the site data acquired by the site data provision apparatus 4 from the relevant site system 6 into the specification required by that service as a service-based transformation rule for that service.

Incidentally, the above-described site data explanatory information, the first and second service explanatory information, and the service-based transformation rule may be registered either via the operation unit 26 (FIG. 1) or by using a communication terminal connected via the site data provision apparatus 4, the network, and so on (hereinafter referred to as the client) CL. The following explanation will be given by assuming that such registration is performed by using the client CL.

When the site data acquisition request is made by the service apparatus 2 as described above, the site data provision apparatus 4 acquires all necessary pieces of site data, which are required by the service apparatus 2 to provide the service, from each corresponding site system 6 by using these registered data explanatory information, first and second service explanatory information, and service-based transformation rule, transforms these acquired pieces of site data into data of the specification according to the service as necessary, and executes site data provision processing for providing the service apparatus 2.

The site data provision program 28 is stored in the ROM 23 (FIG. 1) of the site data provision apparatus 4 as described above as a means for implementing the above-described function of the site data provision apparatus 4. This site data provision program 28 is composed of the following respective modules: a site system information management unit 30, a service information management unit 31, a data granularity judgment unit 32, a query generation unit 33, a query execution control unit 34, a site data reception unit 35, and a site data transformation execution unit 36 as illustrated in FIG. 2.

The site data explanatory information, the first and second service explanatory information, and the service-based transformation rule which are registered by the system administrator as described above are incorporated into the site data provision apparatus 4 via an explanatory information access interface unit 37 which is one function of the communication interface 25 (FIG. 1). Incidentally, the explanatory information access interface unit 37 is an interface for providing the client CL with information of a service-based transformation rule browse/registration screen 50 described later with reference to FIG. 8 for setting and browsing the specification of the site data required by the service and the transformation rule of the relevant site data described later.

Then, from among the site data explanatory information, the first and second service explanatory information, and the service-based transformation rule which have been introduced into the site data provision apparatus 4 via the explanatory information access interface unit 37, the site data explanatory information is given to the site system information management unit 30 and the first and second service explanatory information is given to the service information management unit 31.

The site system information management unit 30 registers and manages the site data explanatory information, which is given with respect to each site data by the explanatory information access interface unit 37, in the site data explanatory information management table 40. Furthermore, from among the first and second service explanatory information given by the explanatory information access interface unit 37, the service information management unit 31 registers and manages the first service explanatory information in the first service explanatory information management table 41 and registers and manages the second service explanatory information in the second service explanatory information management table 42.

Furthermore, the explanatory information access interface unit 37 registers the service-based transformation rule in the transformation rule management table group 43.

Now, the structures of the site data explanatory information management table 40, the first and second service explanatory information management tables 41, 42, and the transformation rule management table group 43 are illustrated in FIG. 3 to FIG. 7, respectively.

Figure 3:
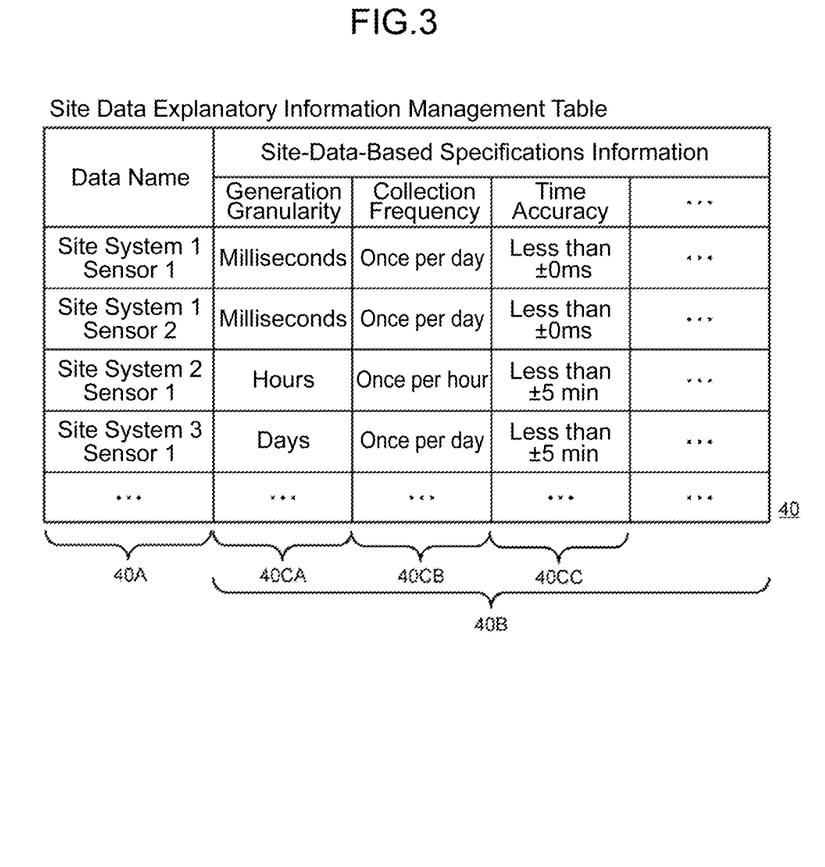
FIG. 3 is a conceptual diagram illustrating the structure of a site data explanatory information management table.

The site data explanatory information management table 40: is a table that is registered by the system administrator as described earlier and is used to manage the specification of each site data; and is composed of a site data name column 40A and a site-data-based specification information column 40B as illustrated in FIG. 3.

Then, the site data name column 40A stores names of all site data which the site data provision apparatus 4 can acquire from any one of the site systems 6 (hereinafter referred to as the site data name(s)). Incidentally, in the case of this embodiment, a combination of an identifier of the site system 6 which acquires the relevant site data, and an identifier of a sensor 11 (FIG. 1) which acquire the relevant site data at that site system 6 is used as such site data name.

Furthermore, the site-data-based specification information column 40B: is composed of a plurality of columns 40CA, 40CB, 40CC, and so on which correspond to the respective items of the specification of the site data such as the generation granularity, the collection frequency, and the time accuracy; and stores values which are set by the system administrator to the respective columns 40CA, 40CB, 40CC, and so on. For example, the column corresponding to the generation granularity (generation granularity column) 40CA stores the generation granularity of the relevant site data; and the column corresponding to the collection frequency (collection frequency column) 40CB stores the collection frequency of the relevant site data. Furthermore, the column corresponding to the time accuracy (time accuracy column) 40CC stores the time accuracy of the relevant site data.

Therefore, in the case of the example of FIG. 3, it is indicated that: site data (whose data name is "site system 1 sensor 1") which is output from the sensor 11 whose name is "sensor 1" of the site system 6 whose name is "site system 1" is output in milliseconds from the sensor (the generation granularity is "milliseconds"); the site data is collected only once per day and accumulated in the site data accumulation unit 13 (the collection frequency is "once per day"); and accuracy of a time cycle during which the site data is generated by the sensor 11 is less than a millisecond unit (the time accuracy is "less than ±0 ms").

Figure 4:
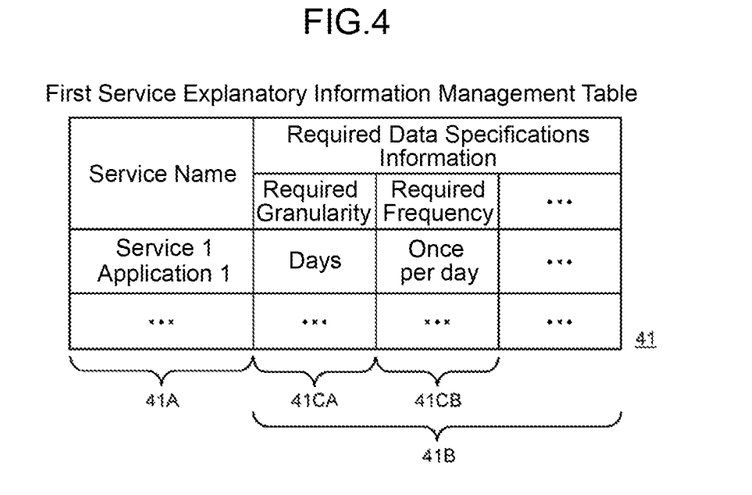
FIG. 4 is a conceptual diagram illustrating the structure of a first service explanatory information management table.

Furthermore, the first service explanatory information management table 41: is a table that is registered by the system administrator and is used to manage the specification of the site data which is required by the service apparatus 2 (to be precise, the service application SAP mounted in the service apparatus 2); and is composed of a service name column 41A and a required data specification information column 41B as illustrated in FIG. 4.

Then, the service name column 41A stores names of all services provided by each service apparatus 2 (hereinafter referred to as the service name(s)). Incidentally, in the case of this embodiment, regarding the service name, a combination of the name of the relevant service (service name) and the name of the service application SAP which executes that service (application name) is used as the service name of the relevant service.

Furthermore, the required data specification information column 41B: is composed of a plurality of columns 41CA, 41CB, and so on which correspond to the respective items of the specification of the site data required by the service apparatus 2 for providing the relevant service; and stores values which are set by the system administrator to the respective columns 41CA, 41CB, and so on. For example, the column corresponding to the required granularity (required granularity column) 41CA stores the granularity of the site data required by the service apparatus 2 for providing the relevant service; and the column corresponding to the required frequency (required frequency column) 41CB stores the frequency at which the service apparatus 2 requires the site data from the site data provision apparatus 4.

Therefore, in the case of the example of FIG. 4, for example, the service whose name is "service 1" provided by the service application SAP whose name is "application 1" (the service name is "service 1 application 1") requires the data, which is obtained by aggregating the site data for one day into one set (the required granularity is "days"), once per day (the required frequency is "once per day").

Figure 5:
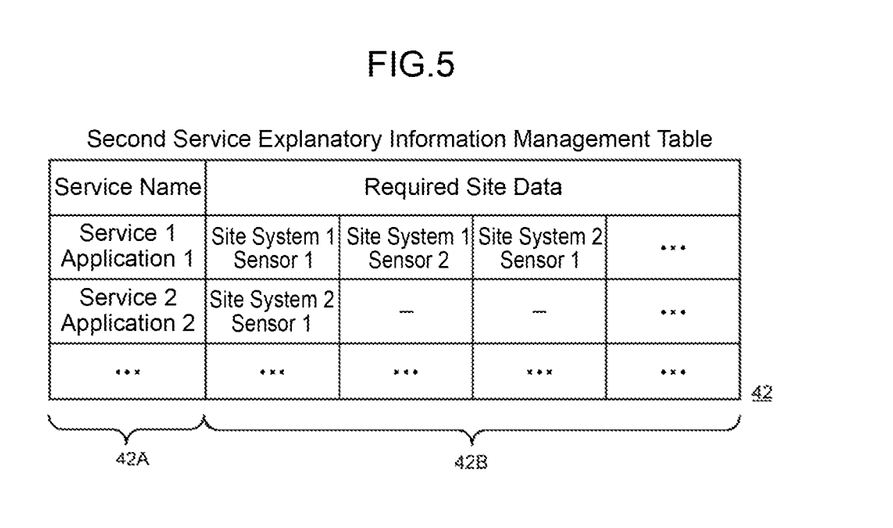
FIG. 5 is a conceptual diagram illustrating the structure of a second service explanatory information management table.

The second service explanatory information management table 42: is a table that is registered by the system administrator and is used to manage the site data to be provided to the service apparatus 2 when a site data acquisition request is made by each service apparatus 2 (to be precise, the service application SAP mounted in the service apparatus); and is composed of a service name column 42A and a required site data column 42B as illustrated in FIG. 5.

Then, the service name column 42A stores the same information as the information stored in the service name column 41A of the first service explanatory information management table 41 as described earlier with reference to FIG. 4. Furthermore, regarding the required site data column 42B, all the site data names of the site data to be provided by the site data provision apparatus 4 to the service application SAP for providing the relevant service are registered.

Therefore, in the case of the example of FIG. 5, for example, when the site data is required by the service application SAP called "application 1" for providing the service called "service 1 application 1," it is shown that the site data called "site system 1 sensor 1," the site data "site system 1 sensor 2," and the site data called "site system 2 sensor 1" should be provided to the service application SAP.

Figure 6:
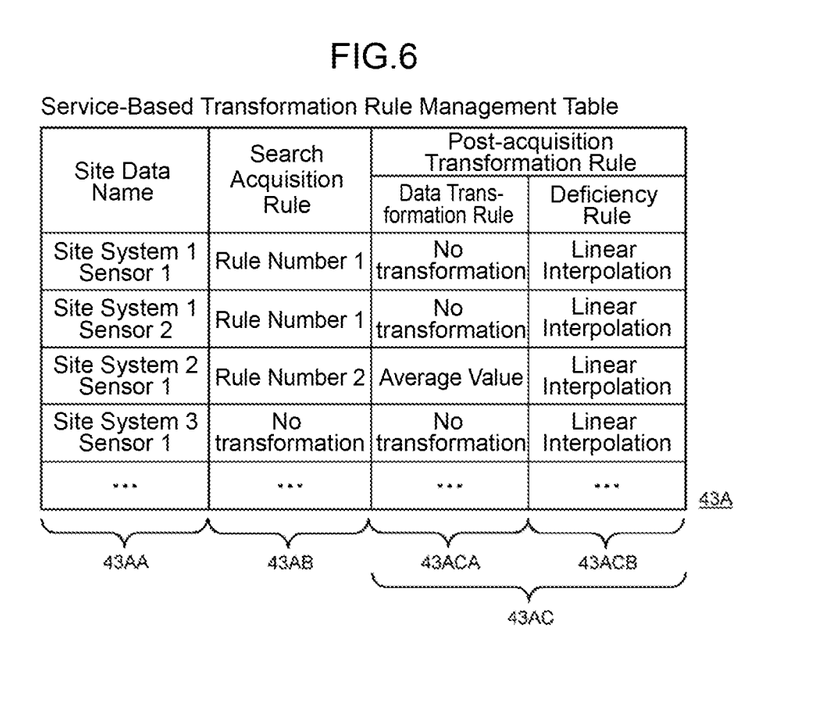
FIG. 6 is a conceptual diagram illustrating the structure of a service-based transformation rule management table.
Figure 7:
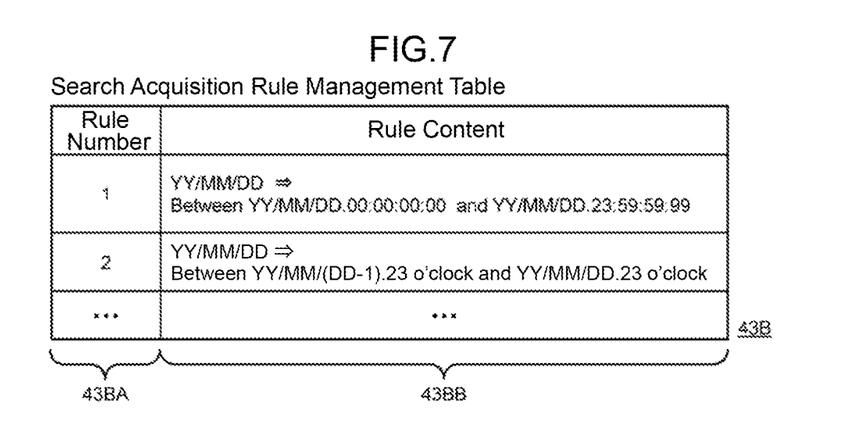
FIG. 7 is a conceptual diagram illustrating the structure of a search acquisition rule management table.

The transformation rule management table group 43 is configured by including a service-based transformation rule management table 43A illustrated in FIG. 6 and a search acquisition rule management table 43B illustrated in FIG. 7.

The service-based transformation rule management table 43A is a table that is used to manage rules when acquiring, from the relevant site system 6, necessary site data defined in the second service explanatory information management table 42 (FIG. 5) in response to the site data acquisition request from the service apparatus 2 and transmitting the acquired site data to that service apparatus 2. This service-based transformation rule management table 43A is composed of a site data name column 43AA, a search acquisition rule column 43AB, and a post-acquisition transformation rule column 43AC as illustrated in FIG. 6.

Then, the site data name column 43AA stores the site data names of all pieces of the site data which can be acquired by the site data provision apparatus 4 from any one of the site systems 6 and can be provided to the service apparatus 2. Furthermore, the search acquisition rule column 43AB stores an identification (rule number) of a rule defining how a description of a query should be changed in accordance with the specification required by the service which uses the relevant site data when searching the site data accumulation unit 13 of the relevant site system 6 for the site data (hereinafter referred to as the search acquisition rule). The details of the search acquisition rule will be explained later.

The post-acquisition transformation rule column 43AC is composed of a data transformation rule column 43ACA and a deficiency rule column 43ACB. Then, the data transformation rule column 43ACA stores a rule defining how the relevant site data should be transformed when providing the relevant site data to the service apparatus 2 (data transformation rule). This data transformation rule is a rule for transforming the specification (the granularity in this example) of the site data accumulated by the site system 6 into the specification (the granularity) of the site data required by the service apparatus 2.

For example, when the granularity of the site data required by the service apparatus 2 is "days" while the granularity of that site data accumulated in the site data accumulation unit 13 for the site system 6 is "milliseconds," it is necessary to change the granularity of the relevant site data into the granularity required by the service apparatus 2 of that site data when providing the site data accumulated in the site data accumulation unit 13 for the site system 6 to the service apparatus 2. In this case, for example, the site data accumulated in the site data accumulation unit 13 for the site system can be transformed into the granularity required by the service apparatus 2 by finding an average value of the site data within the same period as the granularity of the site data required by the service apparatus 2 from among the site data accumulated in the site data accumulation unit 13 for the site system 6. So, in this case, the name "average value" of the data transformation rule meaning that such transformation should be executed is stored in the data transformation rule column 43ACA.

Furthermore, when the specification of the site data accumulated by the site system 6 matches the specification of the site data required by the service apparatus 2, it is unnecessary to transform the specification of such site data when acquiring the site data from the site system and providing the site data to the service apparatus 2. In this case, information stating "no transformation" which means no transformation is to be performed is stored in the data transformation rule column 43ACA.

Furthermore, the deficiency rule column 43ACB stores a rule defining how to deal with a case where the site data of necessary time or time slots is deficient due to, for example, a malfunction of the sensor (hereinafter referred to as the deficiency rule). For example, when the deficient site data is interpolated by means of linear interpolation, information stating "linear interpolation" is stored in the deficiency rule column 43ACB.

The search acquisition rule management table 43B: is a table that is used to manage search acquisition rules of the above-described site data registered by the system administrator; and is composed of a rule number column 43BA and a rule content column 43BB as illustrated in FIG. 7.

Then, the rule number column 43BA stores an identifier of a search acquisition rule that is assigned to the relevant search acquisition rule (an identification number in this example); and the rule content column 43BB stores the content of the relevant search acquisition rule.

For example, it is indicated that when the site data for one day dated "YY/MM/DD" is to be acquired regarding a search acquisition rule with the rule number "1" in FIG. 7, the search acquisition rule defines that a temporal search/acquisition range of the site data should be designated as "Between YY/MM/DD.00:00:00:00 and YY/MM/DD.23: 59:59:59" (that is, the site data generated from "00:00:00: 00" to "23:59:59:59" on "YY/MM/DD") in a query.

Furthermore, a search acquisition rule with the rule number "2" in FIG. 7 is an example where the site data is generated only once an hour and the time accuracy of the generation is high; and when the site data for one day dated "YY/MM/DD" is to be acquired, the search acquisition rule defines that the temporal search/acquisition range of the site data should be designated as "Between YY/MM/(DD-1) .23.00 and YY/MM/DD.23:00" (that is, the site data generated from 23 o'clock of the day immediately preceding "YY/MM/DD" to 23 o'clock of "YY/MM/DD") in a query.

Meanwhile, while this service provision system 1 is in operation, the aforementioned site data acquisition request is issued regularly or irregularly from each service apparatus 2 to the site data provision apparatus 4 via the communication path 3 (FIG. 1). Then, this site data acquisition request is incorporated into the site data provision apparatus 4 via the data access interface unit 38, which is one function of the communication interface 25 (FIG. 1), and is subsequently given to the data granularity judgment unit 32.

After receiving the site data acquisition request, the data granularity judgment unit 32 compares the specification (the granularity in this embodiment) of the site data to be transmitted to the service apparatus 2, which is the transmission source of the site data acquisition request, with the specification (the granularity in this embodiment) of the site data accumulated in the site data accumulation unit 13 for the site system 6 and judges whether they match each other.

Then, if these specifications match each other, the data granularity judgment unit 32 refers to the service-based transformation rule management table 43A (FIG. 6), reads the corresponding search acquisition rule from the search acquisition rule management table 43B (FIG. 7), provides it to the query generation unit 33, and causes the query generation unit 33 to generate a query to read the relevant site data from the relevant site system 6. Moreover, when these specifications do not match each other, the data granularity judgment unit 32 provides the corresponding search acquisition rule to the query generation unit 33 in the same manner as described above and then causes the query generation unit 33 to generate a query to read the site data for the same period of time as the specification (the granularity in this example) of the relevant site data registered in the first service explanatory information management table 41 (FIG. 4) from the relevant site system 6.

Incidentally, when there are a plurality of pieces of site data to be provided to the service apparatus 2, which is the transmission source, in response to the site data acquisition request, the data granularity judgment unit 32 causes the query generation unit 33 to create the above-mentioned query for each piece of the site data.

Then, the query generation unit 33 outputs the above-generated query to the query execution control unit 34. Also, the query execution control unit 34 executes the query received from the query generation unit 33 (that is, transmits the query to the site system 6 via the communication interface unit 39 which is one function of the communication interface 25 (FIG. 1)).

Accordingly, the site system 6 which has received the query reads the site data designated by the query from the site data accumulation unit 13 and transfers it to the site data provision apparatus 4. Then, the site data transferred from the site system 6 is provided to the site data reception unit 35 via the communication interface unit 39 for the site data provision apparatus 4.

Every time the site data reception unit 35 receives the site data transferred from the site system 6, the site data reception unit 35 stores the site data in the site data temporary accumulation unit 44 which is part of storage areas of the nonvolatile storage device 24 (FIG. 1). At the same time, the site data reception unit 35 also notifies the data granularity judgment unit 32 of the reception of the site data.

After receiving the notice, the data granularity judgment unit 32 refers to the data transformation rule column 43ACA (FIG. 6) corresponding to the site data (hereinafter referred to as the received site data) in the service-based transformation rule management table 43A (FIG. 6) for the transformation rule management table group 43 and judges whether or not the data transformation rule for transforming the specification (the granularity in this example) to the received site data.

Then, when such data transformation rule is not set, the data granularity judgment unit 32 notifies the site data transformation execution unit 36 to that effect and of the deficiency rule which is set for the received site data.

Accordingly, under this circumstance, the site data transformation execution unit 36 reads the received site data accumulated in the site data temporary accumulation unit 44, and executes data interpolation processing on the received site data, which has been read, in accordance with the deficiency rule as necessary and also transmits the received site data to the service apparatus 2, which is the transmission source of the site data acquisition request, via the data access interface unit 38.

On the other hand, when such data transformation rule is set, the data granularity judgment unit 32 notifies the site data transformation execution unit 36 to that effect and of the data transformation rule and the deficiency rule which is set for the received site data.

Accordingly, when this happens, the site data transformation execution unit 36 reads the site data accumulated in the site data temporary accumulation unit 44 and executes the data interpolation processing in accordance with the deficiency rule reported from the data granularity judgment unit 32 and the data transformation processing in accordance with the data transformation rule reported from the data granularity judgment unit 32 with respect to the read site data. Then, the site data transformation execution unit 36 transmits the received site data after such data transformation processing (that is, the received site data transformed into the specification (granularity) required by the service apparatus 2) to the service apparatus 2, which is the transmission source of the site data acquisition request, via the data access interface unit 38.

(3) Service-Based Transformation Rule Browse/Registration Screen

Figure 8:
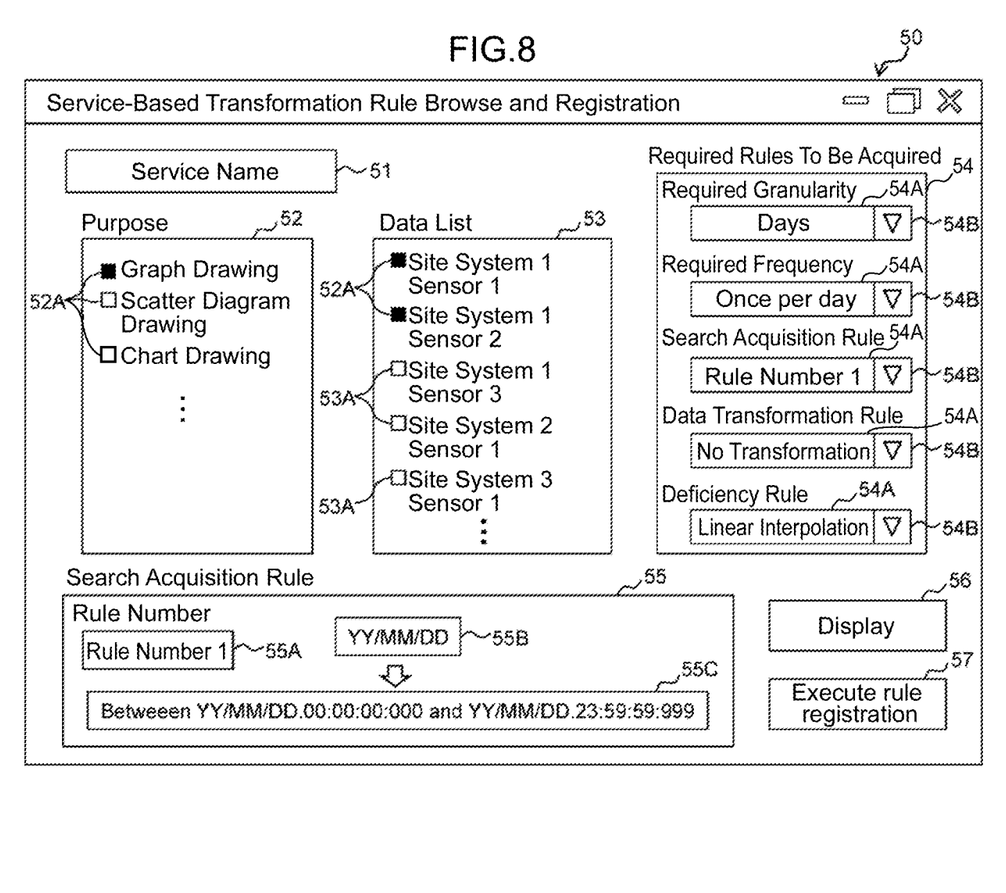
FIG. 8 is a schematic diagram that schematically illustrates a screen structure of a service-based transformation rule browse/registration screen.

FIG. 8 illustrates a service-based transformation rule browse/registration screen 50 which can be displayed on the above-mentioned client CL (FIG. 2) by operating the client CL in a specified manner. This service-based transformation rule browse/registration screen 50 is a screen to register a new service and its service-based transformation rule in the site data provision apparatus 4 or to browse the content of the service-based transformation rule for a service which is already registered in the site data provision apparatus 4.

This service-based transformation rule browse/registration screen 50 is composed of a service name input text box 51, a purpose setting field 52, a data list setting field 53, a required rules-to-be-acquired setting field 54, a search acquisition rule setting field 55, a display button 56, and a rule registration execution button 57.

The service name input text box 51 is a text box for inputting the service name of the relevant service when registering a service-based transformation rule of a new service or when browsing the content of a service-based transformation rule of an already registered service.

On the other hand, the purpose setting field 52 is a field for setting a use purpose of site data for the relevant service when registering a new service. This purpose setting field 52 displays options for the use purpose such as "graph drawing," "scatter diagram drawing," and "chart drawing" and also check boxes 52A associated with these options.

Then, regarding the purpose setting field 52, the relevant option can be set as the use purpose by clicking the check box 52A associated with the option which corresponds to the relevant use purpose. Also, the display form of the check box 52A associated with the option which is then set as the use purpose is changed to a state indicating the relevant option is set as the use purpose (the state of the check box painted in black as illustrated in FIG. 8).

Furthermore, when registering a new service, the data list setting field 53 is a field for setting site data to be transmitted to the service apparatus 2 which provides that service. This data list setting field 53 displays the respective data names of all pieces of the site data which can be acquired by the site data provision apparatus 4 and also displays check boxes 53A associated with these data names, respectively.

Then, the data list setting field 53 can set the relevant site data as site data to be used for the relevant service by clicking a check box 53A associated with the site data to be used for the service. Also, the display form of the check box 53A is changed to a state indicating the relevant site data is set as the site data to be used by the service (the state of the check box painted in black as illustrated in FIG. 8). Incidentally, in the data list setting field 53, a plurality of pieces of site data can be set as the site data to be used for the new service.

The required rules-to-be-acquired setting field 54 is a field used, when registering a new service, to set the specifications of the site data required by the service and a service-based transformation rules corresponding to the service. This required rules-to-be-acquired setting field 54 displays text boxes 54A and pull-down menu buttons 54B which are respectively associated with the respective items of the specification of the site data required by the service, which are registered in the required data specification information column 41B of the first service explanatory information management table 41 as explained earlier with reference to FIG. 4 (items such as the required granularity and the required frequency and these items will be hereinafter referred to as the required data specification item(s)), and the respective items registered in the search acquisition rule column 43AB and the post-acquisition transformation rule column 43AC of the service-based transformation rule management table 43A as explained earlier with reference to FIG. 6 (the respective items of the search acquisition rule, the data transformation rule, and the deficiency rule and these items will be hereinafter referred to as the service-based transformation rule item(s)) Incidentally, FIG. 8 illustrates an example where the required granularity and the required frequency can be set as the required data specification items and the search acquisition rule, the data transformation rule, and the deficiency rule can be set as the service-based transformation rule items.

Then, in the required rules-to-be-acquired setting field 54, a pull-down menu (which is not illustrated in the drawing) in which selectable options are listed as the content of the relevant required data specification item is displayed by clicking the relevant pull-down menu button 54B with respect to each required data specification item; and an option selected by selecting a desired option from among the listed options in the pull-down menu can be set as a set value of the relevant required data specification item. Then, a character string representing the content of the set value which is then set is displayed in the relevant text box 54A of the detailed required data item.

Similarly, in the required rules-to-be-acquired setting field 54, a pull-down menu (which is not illustrated in the drawing) in which selectable options are listed as the content of the relevant service-based transformation rule item is displayed by clicking the relevant pull-down menu button 54B with respect to each service-based transformation rule item of one piece of site data designated by, for example, clicking the data list setting field 53; and an option selected by selecting a desired option from among the listed options in the pull-down menu can be set as a set value of the relevant service-based transformation rule item. Then, a character string representing the content of the set value which is then set is displayed in the relevant text box 54A of the service-based transformation rule item.

Furthermore, the search acquisition rule setting field 55 is a field used, when registering a new service, for setting a search acquisition rule for the service. This search acquisition rule setting field 55 displays a rule number input text box 55A, a target item input text box 55B, and a rewritten information input text box 55C.

Then, regarding the search acquisition rule setting field 55, a new search acquisition rule can be set by inputting the identifier (rule number) of the search acquisition rule to be then set to the rule number input text box 55A, then inputting information of an item to be rewritten in the description of the query to the target item input text box, and inputting the rewritten content to the rewritten input text box. Incidentally, since the search acquisition rule can be automatically created by the site data provision apparatus 4 as described later, it is not always necessary to set a search acquisition rule corresponding to a new service when registering the new service.

When a new service is to be registered in the site data provision apparatus 4 by using the service-based transformation rule browse/registration screen 50 having the above-described structure, the system administrator inputs the service name of the new service to the service name input text box 51, further sets necessary items regarding that service to the purpose setting field 52, the data list setting field 53, the required rules-to-be-acquired setting field 54, and the search acquisition rule setting field 55, respectively, and clicks the rule registration execution button 57. As a result, with the site data provision apparatus 4, the various pieces of information about the service which have been then set on the service-based transformation rule browse/registration screen 50 are stored in the first and second service explanatory information management tables 41 and 42, the service-based transformation rule management table 43A, and the search acquisition rule management table 43B, respectively; and accordingly, the service is registered in the site data provision apparatus 4.

Furthermore, when the system administrator wishes to browse the content of a service-based transformation rule which is set for an already registered service, the system administrator inputs the service name of that service to the service name input text box 51 and then clicks the display button 56. As a result, necessary information that is registered with respect to that service is read from the first and second service explanatory information management tables 41 and 42, the service-based transformation rule management table 43A, and the search acquisition rule management table 43B, respectively; and the use purpose of the site data, the type of the site data used by that service, and information about the required rule to be acquired and the search acquisition rule for the site data by means of the service, which are set for that service, are displayed respectively in the purpose setting field 52, the data list setting field 53, the required rules-to-be-acquired setting field 54, and the search acquisition rule setting field 55 as described above.

Figure 9:
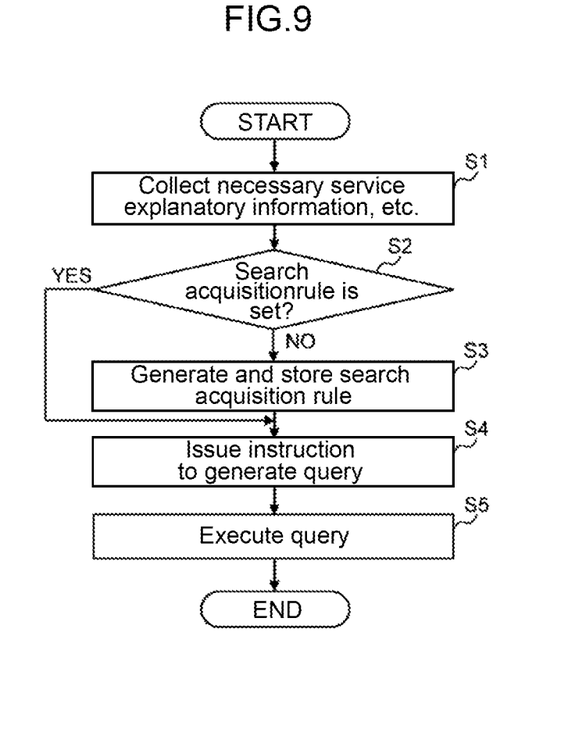
FIG. 9 is a flowchart illustrating a processing sequence for site data acquisition processing.

(4) Processing Flows Relating to Site Data Provision Processing (4-1) Site Data Acquisition Processing FIG. 9 illustrates a flow of site data acquisition processing executed by the site data provision apparatus 4 which has received a site data acquisition request from the service apparatus 2.

When the site data provision apparatus 4 receives the site data acquisition request from the data granularity judgment unit 32 (FIG. 2) via the data access interface unit 38 (FIG. 2), this processing illustrated in FIG. 9 is started and the data granularity judgment unit 32 firstly reads necessary information from the first service explanatory information management table 41, the second service explanatory information management table 42, and the service-based transformation rule management table 43A, respectively (S1).

Specifically speaking, after receiving the site data acquisition request, the data granularity judgment unit 32 acquires the granularity (the required granularity in FIG. 4) of each site data to be transferred to the service apparatus 2 (the service application SAP), which is a transmission source of the site data acquisition request and is registered in the first service explanatory information management table 41, via the service information management unit 31.

Furthermore, the data granularity judgment unit 32 acquires all data names of the site data to be transferred to the service apparatus 2, which is the transmission source of the site data acquisition request and is registered in the second service explanatory information management table 42, via the service information management unit 31.

Furthermore, the data granularity judgment unit 32 acquires values stored in the search acquisition rule column 43AB associated with the above-acquired site data as described above to be transferred to the service apparatus 2, from the search acquisition rule column 43AB of the service-based transformation rule management table 43A (FIG. 6).

Subsequently, the data granularity judgment unit 32 judges whether the search acquisition rules are set to all these pieces of the site data or not, based on the values stored in the search acquisition rule column 43AB corresponding to each piece of the site data to be transferred to the service apparatus 2 which is the transmission source of the site data acquisition request acquired in step S1 (S2).

Specifically speaking, when the relevant value is the rule number of any one of the search acquisition rules or "no transformation," the data granularity judgment unit 32 determines that the search acquisition rule is set to the site data corresponding to that value; and otherwise, the data granularity judgment unit 32 determines that no search acquisition rule is set to the site data corresponding to that value. Then, if the data granularity judgment unit 32 obtains an affirmative result in step S2, it proceeds to step S4.

On the other hand, when the data granularity judgment unit 32 obtains a negative result in the judgment of step S2, it refers to the specification of the site data registered in the site data explanatory information management table 40 (FIG. 3) with respect to each piece of site data, for which no search acquisition rule is set, and then generates a search acquisition rule for each piece of the site data (S3).

For example, when the granularity (the required granularity) of the site data required by the service apparatus 2 which is the transmission source of the site data acquisition request (the service application SAP) is "days" and the generation granularity of the site data is "milliseconds," the data granularity judgment unit 32 acquires a required search acquisition rule of the rule number "1" in FIG. 7. Furthermore, when the granularity of the site data required by such service apparatus 2 (the required granularity) is "days" and the generation granularity of such site data (the generation granularity in FIG. 3) is "time," the data granularity judgment unit 32 generates the required search acquisition rule with the rule number "2" in FIG. 7 also in consideration of the time accuracy of the site data.

Then, the data granularity judgment unit 32 assigns the rule number to the thus-generated search acquisition rule and registers the search acquisition rule in the search acquisition rule management table 43B. Furthermore, the data granularity judgment unit 32 stores the rule number of that search acquisition rule in the relevant row of the site rule in the search acquisition rule column 43AB of the service-based transformation rule management table 43A (S3).

Next, the data granularity judgment unit 32 causes the query generation unit 33 (FIG. 2) to generate a query for each piece of the site data to be transmitted to the service apparatus 2 (the service application SAP) which is the transmission source of the site data acquisition request (S4).

Practically, the data granularity judgment unit 32 reads the search acquisition rule for the relevant site data from the search acquisition rule management table 43B with respect to each piece of the site data and provides the read search acquisition rule and a query generation instruction to acquire the site data to the query generation unit 33. As a result, a query is generated by the query generation unit 33 on the basis of this search acquisition rule.

Subsequently, the query generation unit 33 outputs the generated queries sequentially to the query execution control unit 34 (FIG. 2). Consequently, the queries are executed by the query execution control unit 34 and are sequentially transmitted to their corresponding site systems 6 (S5). Then, when the queries corresponding to all pieces of the site data to be transferred to the service apparatus 2 which had sent the site data acquisition request are executed, this site data acquisition processing terminates.

(4-2) Site Data Transfer Processing

Figure 10:
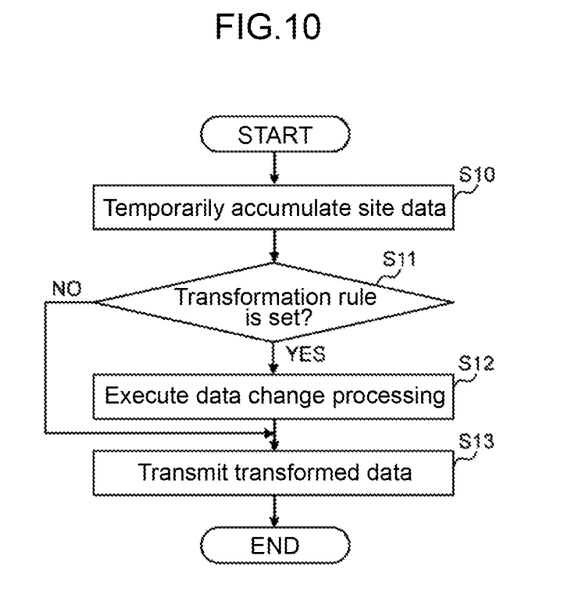
FIG. 10 is a flowchart illustrating a processing sequence for site data transfer processing.

Meanwhile, FIG. 10 is a flowchart illustrating a flow of site data transfer processing executed by the site data provision apparatus 4 that has received the site data transferred from the site system 6 to which the query execution control unit 34 transmitted the query.

When the site data reception unit 35 (FIG. 2) for the site data provision apparatus 4 receives the site data, which has been transferred from the site system 6, via the communication interface unit 39 (FIG. 2), the processing illustrated in this FIG. 10 is started at the site data provision apparatus 4. Then, the site data reception unit 35 firstly stores the then received site data (hereinafter referred to as the received site data) in the site data temporary accumulation unit 47 and notifies the data granularity judgment unit 32 of the receipt of the site data (S10).

The data granularity judgment unit 32 which has received this notice judges whether the data transformation rule is set for such received site data or not (S11). Specifically speaking, the data granularity judgment unit 32 accesses the service-based transformation rule management table 43A (FIG. 6) via the service information management unit 31, acquires a value stored in an entry (row) corresponding to the received site data in the data transformation rule column 43ACA, and judges whether that value is a value other than "no transformation" or not.

Obtaining a negative result in this judgment (S11: NO) means that the granularity of the site data required by the service apparatus 2 (the required granularity) matches the granularity of the site data accumulated in the site data accumulation unit 13 by the relevant site system 6 (collection granularity) and, therefore, no data transformation rule is set for the received site data.

Accordingly, when this happens, the data granularity judgment unit 32 issues an instruction to the site data transformation execution unit 36 (FIG. 2) to transfer the received site data, which is accumulated in the site data temporary accumulation unit 44, without any change to the service apparatus 2 (hereinafter referred to as the untransformed data transfer instruction). At the same time, the data granularity judgment unit 32 also acquires a deficiency rule stored in an entry (row) corresponding to the received site data in the deficiency rule column 43ACB (FIG. 6) of the service-based transformation rule management table 43A via the service information management unit 31 and notifies the site data transformation execution unit 36 to this effect.

Then, the site data transformation execution unit 36 which has received such untransformed data transfer instruction and the deficiency rule reads the received site data from the site data temporary accumulation unit 44; and if there is any deficient data in the received site data which has been read, the site data transformation execution unit 36 interpolates the data in accordance with the deficiency rule reported from the data granularity judgment unit 32 and transfers the received site data, without any change, via the data access interface unit 38 (FIG. 2) to the service apparatus 2 which is the transmission source of the site data acquisition request (S13). As a result of the above, the site data transfer processing on this received site data terminates.

On the other hand, obtaining an affirmative result in the judgment of step S11 (S11: YES) means that the granularity of the site data required by the service apparatus 2 (the required granularity) does not match the granularity of the site data accumulated in the site data accumulation unit 13 by the relevant site system 6 (the collection granularity) and, therefore, a data transformation rule is set to adjust the granularity of the received site data to such required granularity.

Accordingly, when this happens, the data granularity judgment unit 32 notifies the site data transformation execution unit 36 of the value which is stored in the entry (row) corresponding to the received site data in the data transformation rule column 43ACA of the service-based transformation rule management table 43A and is acquired in step S11 (that is, the data transformation rule) and also issues an instruction to the site data transformation execution unit 36 to transform the received site data, which is accumulated in the site data temporary accumulation unit 44, in accordance with the data transformation rule (this instruction will be hereinafter referred to as the transformed data transfer instruction). At the same time, the data granularity judgment unit 32 also acquires the deficiency rule stored in the entry (row) corresponding to the received site data in the deficiency rule column 43ACB (FIG. 6) of the service-based transformation rule management table 43A via the service information management unit 31 and notifies the site data transformation execution unit 36 to this effect.

Then, the site data transformation execution unit 36 which has received the transformed data transfer instruction and the deficiency rule reads the received site data from the site data temporary accumulation unit 44; and when there is deficient data in the received site data which has been read, the site data transformation execution unit 36 interpolates the data in accordance with the deficiency rule reported from the data granularity judgment unit 32 and also executes the data transformation processing on the received site data in accordance with the transformation rule which is then reported from the data granularity judgment unit 32 (S12).

Subsequently, the site data transformation execution unit 36 transfers the received site data, on which the data transformation processing has been executed in step S12, via the data access interface unit 38 (FIG. 2) to the service apparatus 2 which is the transmission source of the site data acquisition request (S13). As a result, the site data transfer processing on this received site data terminates.

Incidentally, a plurality of types of site data may be sometimes used, depending on the type of the service in order to provide the user with the service. In this case, queries are given to a plurality of site systems 6, in each of which necessary site data for the service are accumulated, the site data required by the plurality of site systems 6 will be transferred sequentially.

Therefore, in this case, the site data provision apparatus 4 repeats the site data transfer processing in FIG. 10 every time the site data is transferred from each site system 6.

(5) Advantageous Effects of this Embodiment

When the service provision system 1 according to this embodiment as described above receives the site data acquisition request from the service apparatus 2, the service provision system 1 acquires all pieces of the site data required by the services from the relevant site systems 6 on the basis of the explanatory information of each service and the explanatory information of each site data, and the transformation rule of the site data of each service (the service-based transformation rule), which are registered in advance, transforms the specification of each piece of the acquired site data into the specification required by the service, and transmits these pieces of site data to the service apparatus 2.

Therefore, regarding this service provision system 1, even if there is a difference between the specification of the site data required by the service and the actual specification of the site data, the difference can be absorbed by the site data provision apparatus 4 and the site data with the specification required by the service can be provided to the service apparatus 2. Accordingly, the administrator of the service apparatus does not have to be aware of, for example, equipment changes of each site system 6; and even when the specification of the site data is changed due to the equipment change of the site system 6, it is unnecessary to, for example, modify the service application SAP of the service apparatus 2 and, therefore, it is possible to hold down the management cost of the service apparatus 2.

(6) Other Embodiments

Incidentally, the aforementioned embodiment has described the case where when no search acquisition rule is set for the site data to be transferred to the service apparatus 2 which is the transmission source of the site data acquisition request in step S2 of the site data acquisition processing (FIG. 9), the data granularity judgment unit 32 for the site data provision apparatus 4 automatically creates the search acquisition rule. However, the present invention is not limited to this example; and, for example, even when no data search rule or deficiency rule is set for such site data, the data granularity judgment unit 32 may automatically set the data search rule or the deficiency rule.

For example, regarding the data transformation rule, when the specification (granularity) of the site data is the same as the specification (granularity) of the site data required by the service, "no transformation" (see FIG. 6) is set; and when they are different from each other, the rule for transforming the site data may be set as an "average value" of the site data within the same time period as that of the granularity of the site data required by the service. Furthermore, the deficiency rule may be always set as the linear interpolation.

Furthermore, the aforementioned embodiment has described the case where the "specification" used when changing the specification of the site data to the specification required by the service is the "granularity" of the site data; however, the present invention is not limited to this example and the site data provision apparatus 4 may transform the site data in order to also adjust the specification, other than the "granularity," of the site data to the specification required by the service.

INDUSTRIAL APPLICABILITY

The present invention can acquire the site data from the site(s) and apply the service, which uses the acquired site data, to the service provision system.

REFERENCE SIGNS LIST 1 service provision system
2, 2A, 2B service apparatus
4 site data provision apparatus
6 site system
13, 13A, 13B site data accumulation unit
21 CPU
28 site data provision program
30 site system information management unit
31 service information management unit
32 data granularity judgment unit
33 query generation unit
34 query execution control unit
36 site data transformation execution unit
40 site data explanatory information management table
41 first service explanatory information management table
42 second service explanatory information management table
43 transformation rule management table group
43A service-based transformation rule management table
43B search acquisition rule management table
50 service-based transformation rule browse/registration screen
CL client
SAP service application

The invention claimed is:
1. A data provision apparatus for providing site data to a service apparatus for providing a service by using one or more pieces of site data respectively collected at one or more sites,
the data provision apparatus comprising an arithmetic operation unit and a storage unit, wherein the storage unit includes:
previously registered explanatory information of each piece of the site data including a specification of the site data;
explanatory information of the service including the site data and a specification of the site data which are required by the service;
a transformation rule for transforming the specification of the site data into the specification required by the service which uses the site data; and
a search acquisition rule, when searching and acquiring the site data, that: defines a change in a query for acquiring the site data if generation granularity for generating the site data does not match required granularity of the site data which is required by the service; and defines no change in the query for acquiring the site data if the generation granularity for generating the site data matches the required granularity of the site data which is required by the service; and
wherein the arithmetic operation unit includes:
a data granularity judgment unit that acquires the required granularity of the site data by referring to the explanatory information of the service in response to a request to acquire the site data from a service apparatus and generates a query for acquiring the site data generated with the generation granularity according to the search acquisition rule;
an accumulation unit that accumulates the site data acquired by the generated query; and
a site data transformation execution unit that refers to the explanatory information of the site data, the explanatory information of the service, and the transformation rule in response to a transfer request of the site data from the service apparatus, transforms the site data which are accumulated in the accumulation unit and are to be used by the service provided by the service apparatus into data of the specification required by the service, respectively, and transfers the transformed data to the service apparatus.

2. The data provision apparatus according to claim 1, wherein the data granularity judgment unit compares the generation granularity with the required granularity to see if they match each other; and
if the generation granularity does not match the required granularity, the data granularity judgment unit generates a query for acquiring the site data for the same period with that of the required granularity of the site data from the site data generated with the generation granularity according to the search acquisition rule which defines the change in the query; and
if the generation granularity matches the required granularity, the data granularity judgment unit generates the query for acquitting the site data generated with the generation granularity according to the search acquisition rule which defines no change in the query.

3. The data provision apparatus according to claim 1, further comprising an interface that provides information of a screen for setting and browsing the specification of the site data required by the service and the transformation rule for the site data.

4. A data provision method executed by a data provision apparatus for providing site data to a service apparatus for providing a service by using one or more pieces of site data respectively collected at one or more sites,
the data provision apparatus including an arithmetic operation unit and a storage unit,
wherein the storage unit stores:
previously registered explanatory information of each piece of the site data including a specification of the site data;
explanatory information of the service including the site data and a specification of the site data which are required by the service;
a transformation rule for transforming the specification of the site data into the specification required by the service which uses the site data; and
a search acquisition rule, when searching and acquiring the site data, that: defines a change in a query for acquiring the site data if generation granularity for generating the site data does not match required granularity of the site data which is required by the service; and defines no change in the query for acquiring the site data if the generation granularity for generating the site data matches the required granularity of the site data which is required by the service,
the data provision method comprising:
a first step executed by the arithmetic operation unit acquiring the required granularity of the site data by referring to the explanatory information of the service in response to a request to acquire the site data from the service apparatus and generating the query for acquiring the site data generated with the generation granularity according to the search acquisition rule;
a second step executed by the arithmetic operation unit accumulating the site data acquired by the generated query in an accumulation unit; and
a third step executed by the arithmetic operation unit referring to the explanatory information of the site data, the explanatory information of the service, and the transformation rule in response to a transfer request of the site data from the service apparatus, transforming the site data which are accumulated in the accumulation unit and are to be used by the service provided by the service apparatus into data of the specification required by the service, respectively, and transferring the transformed data to the service apparatus.

5. The data provision method according to claim 4, wherein in the first step, the arithmetic operation unit compares the generation granularity with the required granularity to see if they match each other; and
if the generation granularity does not match the required granularity, the arithmetic operation unit generates a query for acquiring the site data for the same period with that of the required granularity of the site data from the site data generated with the generation granularity according to the search acquisition rule which defines the change in the query; and
if the generation granularity matches the required granularity, the arithmetic operation unit generates the query for acquitting the site data generated with the generation granularity according to the search acquisition rule which defines no change in the query.

6. The data provision method according to claim 4, wherein the data provision apparatus includes an interface that provides information of a screen for setting and browsing the specification of the site data required by the service and the transformation rule for the site data.

* * * * *